United States Patent [19]

Keeley et al.

[11] Patent Number: 4,802,087
[45] Date of Patent: Jan. 31, 1989

[54] MULTIPROCESSOR LEVEL CHANGE SYNCHRONIZATION APPARATUS

[75] Inventors: James W. Keeley, Nashua, N.H.; George J. Barlow, Tewksbury, Mass.

[73] Assignee: Honeywell Bull Inc., Waltham, Mass.

[21] Appl. No.: 879,858

[22] Filed: Jun. 27, 1986

[51] Int. Cl.[4] ............................................. G06F 13/14
[52] U.S. Cl. ............................................. 364/200
[58] Field of Search .............................. 364/200, 900

[56] References Cited

U.S. PATENT DOCUMENTS

| | | | |
|---|---|---|---|
| 4,035,780 | 7/1977 | Kristick et al. | 364/900 |
| 4,459,665 | 7/1984 | Miu et al. | 364/200 |
| 4,464,717 | 8/1984 | Keeley et al. | 364/200 |
| 4,470,111 | 9/1984 | Jenkins et al. | 364/200 |

*Primary Examiner*—Gareth D. Shaw
*Assistant Examiner*—Adolfo Ruiz
*Attorney, Agent, or Firm*—Faith F. Driscoll; John S. Solakian

[57] ABSTRACT

An apparatus is included within the bus interface circuits of each processing unit of a multiprocessing system which connect in common with the other units of the system to an asynchronous system bus. The apparatus and interrupt signal couple to the processing unit's level register and interrupt circuits. In response to a command specifying a level change, the apparatus conditions these circuits to store level and interrupt signals applied to the system bus as part of such CPU command during a bus cycle of operation granted to the processing unit on a priority basis. This ensures the reliable switching between interrupt levels and the notification of such level changes to the other units of the system without interference from other processing units.

12 Claims, 6 Drawing Sheets

| COMMAND BUS LINES CODING | B S M R E F | B S W R I T | B S L O C K | B S S H B C | B S D B W D | B S D B P L | B S B Y T E | B S R I N T | |
|---|---|---|---|---|---|---|---|---|---|
| | 0 | X | X | 0 | X | X | X | 0 | NORMAL I/O INTERRUPT |
| | 0 | X | X | 0 | X | X | X | 1 | CPU LEVEL CHANGE INTERRUPT |

ADDRESS BUS LINES CODING
- BSAD0A-0H — DON'T CARE WITH GOOD PARITY
- BSAD00-07 — DON'T CARE WITH GOOD PARITY
- BSAD08-17 — CPU CHANNEL NO. (OWN)
- BSAD18-23 — FUNCTION CODE (SEE TABLE I)

DATA BUS LINES CODING
- BSDT00-08 — DON'T CARE WITH GOOD PARITY
- BSDT09 — DON'T CARE
- BSDT10-15 — NEW LEVEL NO.
- BSDT16-31 — DON'T CARE WITH GOOD PARITY

| TABLE I | | | | | | | | |
|---|---|---|---|---|---|---|---|---|
| BUS ADDRESS | 18 | 19 | 20 | 21 | 22 | 23 | BSDT09 | LEVEL REG | I/O INTR BUSY FLIP-FLOP |
| CPU LEVEL CHANGE INTERRUPT | 0 | 0 | 0 | 0 | 0 | 0 | X | BSDT10-15→REG | NO CHANGE |
| CPU LEVEL CHANGE INTERRUPT | 0 | 0 | 0 | 0 | 0 | 1 | X | BSDT10-15→REG | CLEARED |
| NORMAL I/O INTERRUPT | X | X | X | X | X | X | X | BSDT10-15 ≤ LEVEL REG | SET BUSY |

Fig. 4.

MULTIPROCESSOR LEVEL CHANGE SYNCHRONIZATION APPARATUS

BACKGROUND OF THE INVENTION

1. Field of Use

This invention pertains to data processing systems and more particularly to interrupt apparatus utilized in conjunction with such systems.

2. Prior Art

As well known, many systems have processing units which employ interrupt apparatus for servicing interrupts from competing devices on a priority basis. Normally, this is achieved by assigning priority interrupt levels to the competeing devices which are compared for enabling the device having the higher priority interrupt gain access to the system or processing unit. After the device's request has been seviced, the processing unit sends out a signal to the devices for indicating its readiness to service new interrupts at the current interrupt level. An example of this type of system is disclosed in U.S. Pat. No. 3,984,820.

While it is possible to initiate level changes in response to program instructions without difficulty, problems arise when making changes while servicing asynchronously arriving external interrupts generated by devices connected to an asynchronous system bus such as that described in U.S. Pat. Nos. 3,993,981 and 4,371,928, assigned to the same assignee as named herein. One way of ensuring reliable switching is to include circuits for detecting when system bus activity has ceased and enabling the level change to take place at that time.

The above appraoch requires a considerable amount of cicuitry and is limited to a system which included a single processing unit. That is, in systems which include more than one processing unit, it is possible for more than one processing unit to change interrupt levels at the same time giving rise to improper notification of such switching to the other devices connected to the system bus. For example, the notification signals simultaneously generated by two processing units could cancel or interfere with one another depending on the relative positioning of each processing unit on the system bus so as to be misinterpreted by the receiving devices.

Accordingly, it is a primary object of the present invention to provide an interrupt change apparatus for use in a multiprocessing system.

It is a further object of the present invention to provide interrupt level change apparatus which operates reliably in a multiprocessing system independent of the number of processing units included in the system.

SUMMARY OF THE INVENTION

The above objects and advantages of the invention are achieved in a preferred embodiment of a multiprocessing system. According to the present invention, an apparatus is included within the bus interface circuits of each processing unit of the system which connects through such interface circuits to an asynchronous system bus in common with the remaining units of the system. The apparatus couples to the processing unit's level register and interrupt circuits.

In operation, the apparatus in reponse to each command coded to specify a level change conditions the interrupt circuits to store level and interrupt indicator signals included as part of the command when it is applied to the system bus when the processing unit is granted a bus cycle. During the bus cycle of operation, the processing unit operates to send out a notification signal to the devices within the system as part of the same command.

By changing levels only during a bus cycle of operation, this eliminates interference from any asynchronously occurring external events. Additionally, it ensures that only a single processing unit makes a level change at any given time eliminating the possibility of improper notification.

The apparatus of the present invention achieves the above with the introduction of little additional circuits. This is accomplished by maximizing the use of existing bus interface circuits.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

BRIEF DESCRIPTION OF THE DRAWINGS

FIG. 4 shows the format of requests utilized by the apparatus of the present invention.

DESCRIPTION OF THE SYSTEM OF FIG. 1

Figure 1:
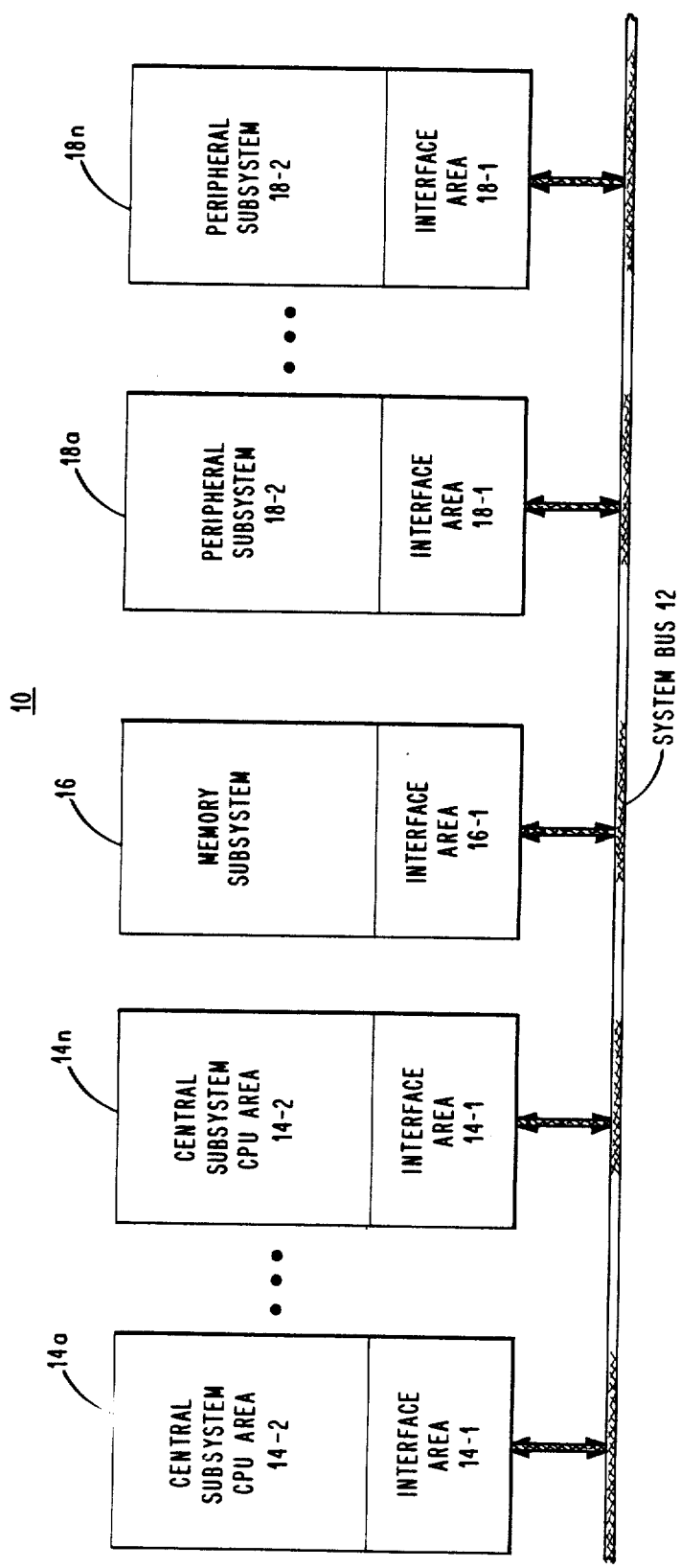
FIG. 1 is a block diagram of a system which includes the apparatus of the present invention.

FIG. 1 shows a multiprocessing system 10 which includes a plurality of subsystems 14 through 18n. The illustrative subsystems include a number of central subsystems 14a through 14n, a memory subsystem 16 and a number of peripheral subsystems 18a through 18n. Each subsystem includes an interface area which enables the unit or units associated therewith to transmit or receive requests in the form of commands, interrupts, data or responses/status to another unit on system 12 in an asynchronous manner. Each of the interface areas includes bus interface logic circuits of the type disclosed in FIG. 9 of U.S. Pat. No. 3,995,258.

As mentioned, each of the interface areas 14-1a through 14-1n of the central subsystems 14a through 14n includes the apparatus of the present invention. All of these interface areas are equivalent in design. Hence, only interface area 14-1 will be described in detail with reference to FIG. 2.

GENERAL DESCRIPTION OF CENTRAL SUBSYSTEM 14-1a

Figure 2:
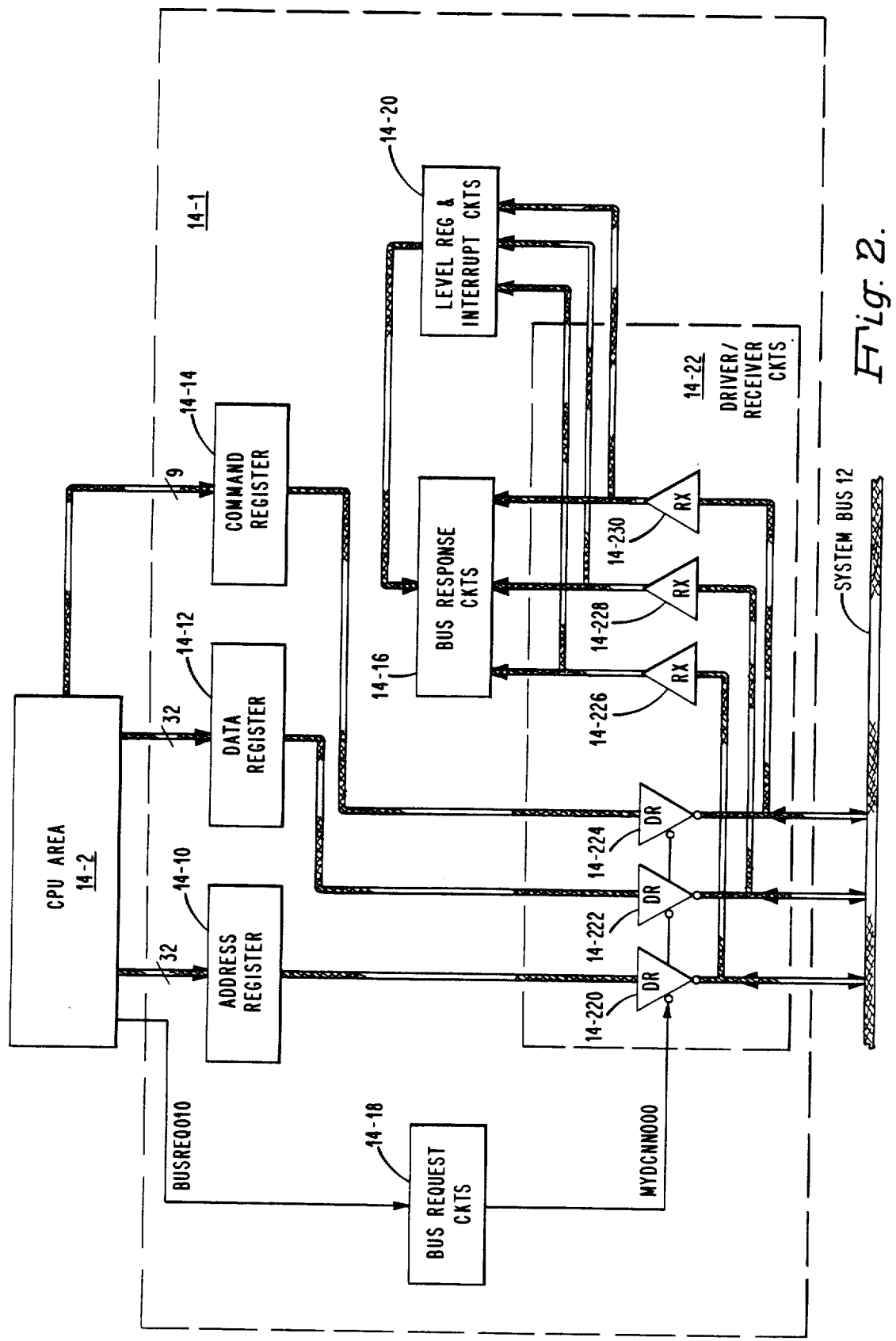
FIG. 2 shows in block diagram form, the central subsystem of FIG. 1 which includes the apparatus of the present invention.

Referring to FIG. 2, it is seen that central subsystem 14a includes CPU area 14-2 and interface area 14-1. CPU area 14-2 includes a microprogrammed processing unit which operates to generate requests in the form of commands which are applied to the port registers 14-10 through 14-14 of interface area 14-1 together with a bus request signal BUSREQ010 which is applied as an input to the bus request circuits of block 14-18.

As shown, the registers 14-10 through 14-14 individually couple to the address, data and command portions of system bus 12 via driver circuits 14-220 through 14-224 of block 14-22. When enabled by a my data cycle, now signal MYDCNN000 from the bus request circuits 14-18, the driver circuits apply the CPU bus request to system bus 12.

Additionally, block 14-22 includes a corresponding number of receiver circuits 14-226 through 14-230 which couple in common with the driver circuits to the address, data and command portions of system bus 12 as shown. These circuits apply signals from system bus 12 to the bus response circuits of block 14-16 and to the level register and interrupt circuits of block 14-20. Additionally, the circuits of blocks 14-16 and 14-20 are coupled as shown for transmitting and receiving signals respectively.

DETAILED DESCRIPTION OF INTERFACE AREA 14-1

Figure 3A:
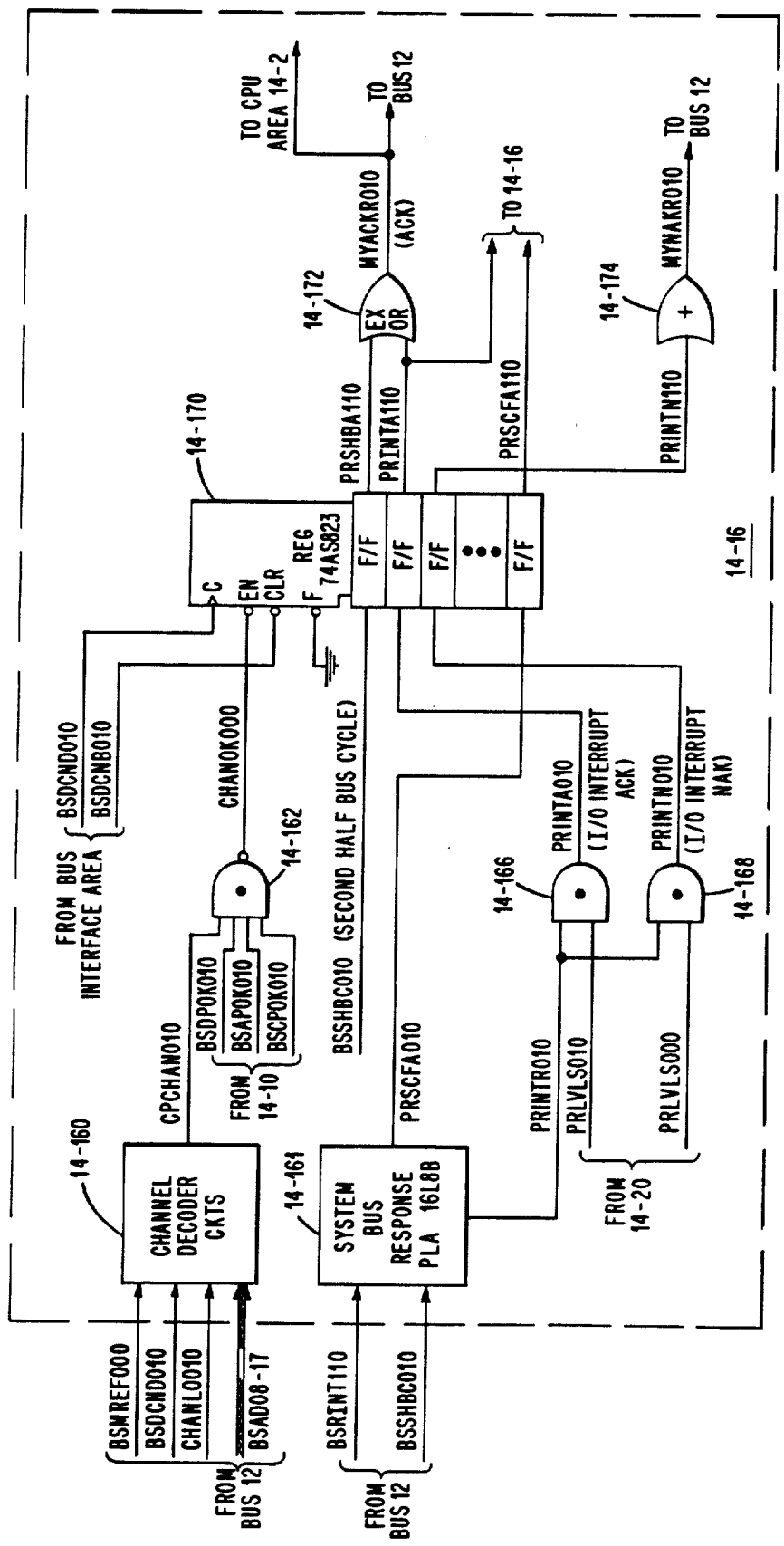
FIGS. 3a and 3b show in greater detail, the central subsystem interface area of FIG. 2.
Figure 3B:
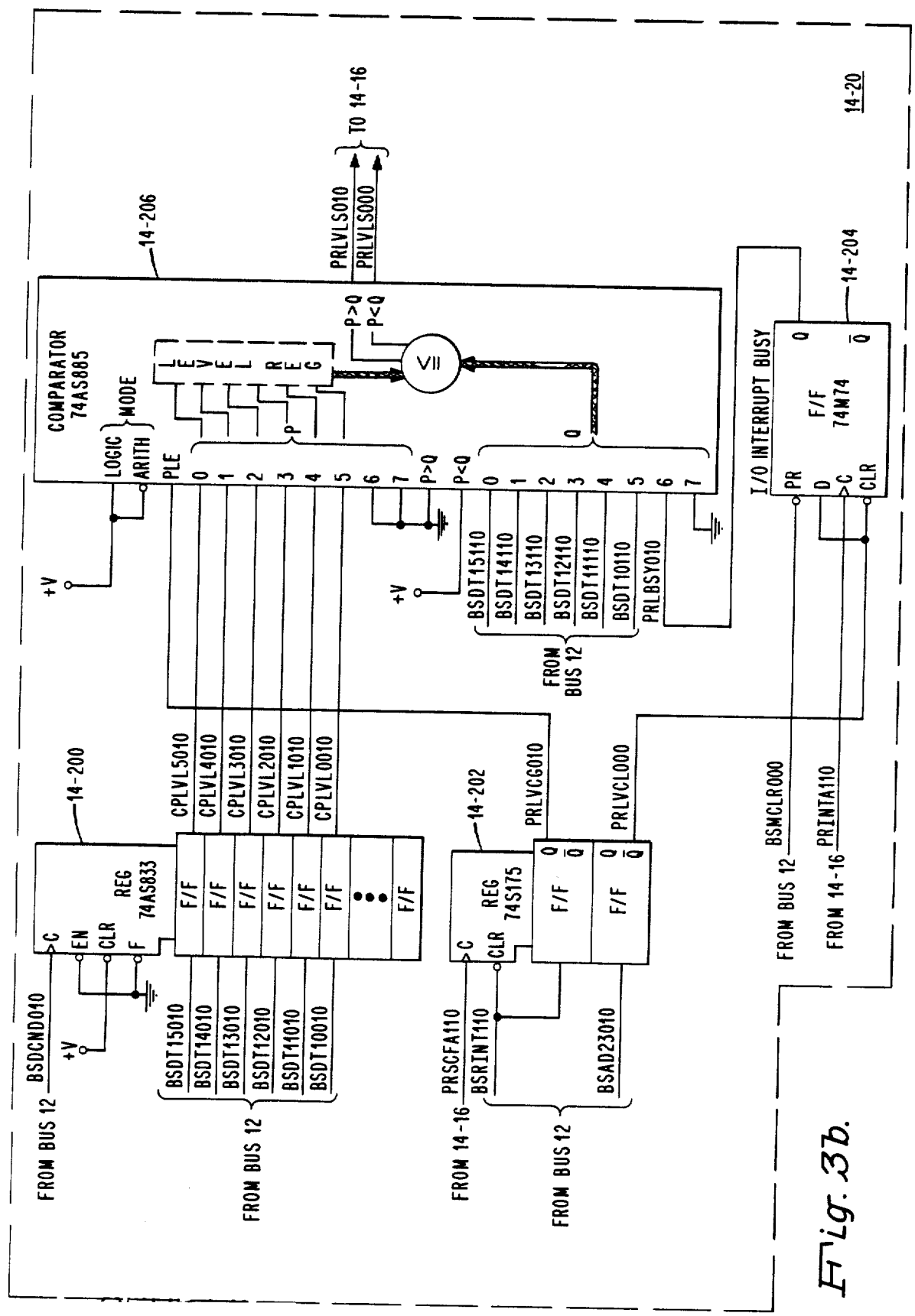

FIGS. 3a and 3b respectively show in greater detail, the bus response circuits 14-16 and level register and interrupt circuits 14-20 of FIG. 2 which include the apparatus of the present invention. Referring first to FIG. 3a, the circuits of block 14-16 include channel decoder circuits 14-160, a system bus response PLA 14-161, a NAND gate 14-162, a plurality of AND gates 14-166 through 14-168, a 9-bit register 14-170, an output exclusive OR gate circuit 14-172 and OR gate 14-174 connected as shown. The gates and register are conventional in design. For example, register 14-170 may be constructed from a 74AS823 chip circuit manufactured by Texas Instruments Corporation. The circuit 14-161 may be constructed from a AmPL16L8B chip circuit manufactured by Advanced Micro Devices, Inc.

The circuits of block 14-160 operate to detect when the unique channel number assigned to central subsystem 14-2 is applied to system bus 12 in resonse to other than a memory command (i.e., signal BSMREF000=1). These circuits include a comparison circuit which compares the received channel number with an internally stored channel number and forces CP channel signal CPCHAN010 to a binary ONE upon detecting an identical comparison therebetween.

NAND gate 14-162 combines signal CPCHAN010, bus data priority OK signal BSDPOK010, bus command parity OK signal BSCPOK010 and bus address parity OK signal BSAPOK010 to produce channel OK signal CHANOK000. It forces signal CHANOK000 to binary ZERO when integrity checking circuits 14-10, not shown, have verified that all of the specified parts of the request received by central subsystem 14 are valid. This, in turn, enables register 14-170 for storing the state of signals BSSSHBC010, PRINTA010, PRINTN010 and PRSCFA010 in reponse to a bus data cycle now delayed signal BSDNCD010. Signal BSDCN010 defines the interval of time during which the addressed subsystem (slave) will have been able to detect its channel address. For further discussion, reference may be made to U.S. Pat. No. 3,995,258.

The signals BSSHBC010 through PRINTN010 identify the type of bus cycle being performed and are used to generate either an acknowledgement or negative acknowledgement response signal. In greater detail, the second half bus cycle is the interval during which previously requested information is transferred to the requesting subsystem. It is the second cycle of the two cycle operation, such as a read operation. Signal BSSHBC010 is received from system bus 12 when the subsystem (e.g. memory subsystem 16 is transferring the data previously requested by central subsystem 14).

AND gates 14-166 and 14-168 combine CPU interrupt signal PRINTR010 from PLA circuit 14-161 and processor level signals PRLVLS010 and PRLVLS000 from interrupt circuits 14-20 of FIG. 3b to produce I/O interrupt acknowledgement and negative acknowledgement signals PRINTA010 and PRINTN010. The CPU interrupt signal PRINTR010 and processor level signal PRLVLS010 when both binary ONES indicate that the interrupting subsystem has a higher priority than the current operating level (i.e., level number value is less) and causes AND gate 14-166 to force acknowledgement signal PRINTA010 to a binary ONE. At that time, processor level signal PRLVLS000 is a binary ZERO. However, when processor level signal PRLVLS000 is a binary ONE indicating that the interrupting subsystem has a lower priority than the current operating level, AND gate 14-168 forces negative acknowledgement signal PRINTN010 to a binary ONE.

The acknowledgement signals PRSHBSA110 and PRINTA110 are combined within exclusive OR gate 14-172 for checking purposes so that may acknowledgement signal MYACKR010 is generated when only one of the acknowledgement signals is a binary ONE. The negative acknowledgement signal PRINTN110 when a binary ONE causes OR gate 14-174 to force my negative acknowledgement signal MYNAKR010 to a binary ONE. As seen from FIG. 3a, signals MYACKR010 and MYNAKR010 are applied to system bus 12 via conventional driver circuits, not shown.

Acknowledgement signal PRSCFA010 is generated by PLA circuit 14-161 in response to bus signals BSRINT110 and BSSHBCO010. This signal is used to indicate that a level change command was sent to bus 12 (i.e., both signals BSRINT110 and BSSHBC010 are ONES). It is forwarded along with signal PRINTA110 to the interrupt circuits 16-20 of FIG. 3a.

Also, PLA cirucit 14-161 operates to force CPU interrupt signal PRINTR010 to force CPU interrupt signal PRINTR010 to a binary ONE signalling the presence of an interrupt as a result of an I/O interrupt command being applied to system bus 12 by a peripheral subsystem. Signal PRINTR010 is a generated according to the following Boolean equation:

PRINTR010=BSRINT100·BSSHBC100.

FIG. 3b shows in greater detail, the circuits of block 14-20. These circuits include a but input register 14-200, a level change command register 14-202, CPU I/O interrupt busy indicator register 14-204 and a level register and comparator circuit 14-206. The input register 14-200 couples to bus 12 and enabled by bus data cycle now delayed signal BSDCND010 for storing the states of signals BSDT15010 through BSDT10010. The output signals CPLVL0010 through CPLVL5010 of register 14-200 are applied as one set of inputs (P) to circuit 14-206.

The level change command register 14-202 couples to bus 12 for receiving signals BSRINT110 and BSAD23010 and to response circuits 14-16 to receive acknowledgement signal PRSCFA110. The contents of register 14-202 are cleared to ZEROS when signal BSRINT110 is a binary ZERO. In response to signal PRSCFA110, the states of signals BSRINT110 and BSAD23010 are stored in register 14-202 for the interval of time that signal BSRINT110 remains a binary ONE. The output signals PRLVCG010 and PRLVCL000 respectively are applied as inputs to an enable input (PLE) of comparator circuit 14-206 and a data input of interrupt indicator flip-flop 14-204 as shown.

Interrupt indicator 14-204 is preset to a binary ZERO state in response to a bus master clear signal BSMCLR000. It is forced to a binary ONE state when signal PRLVCL000 switches from a binary ZERO to a binary ONE in response to interrupt acknowledge signal PRINTA110 being switched from a binary ZERO to a binary ONE by circuits 14-16. The output interrupt busy signal PRLVSY010 is applied to the least significant bit input of the second set of inputs (Q) of comparator circuit 14-206. The remaining set of inputs are connected to receive signals BSDT10110 through BSSDT15110 from bus 10.

The level register and comparator circuit 14-206 includes a comparator circuit which operates in the manner mentioned to compare the current level number stored within an internal level register to a level number from an interrupting subsystem. When the priority of the current interrupt level is equal to or greater than the interrupting subsystem interrupt level, circuit 14-206 forces processor level signal PRLVLS010 to a binary ONE and signal PRLVLS000 to a binary ZERO. When the priority is less, comparator circuit 14-206 forces signal PRLVLS010 to a binary ZERO and signal PRLVS000 to a binary ONE. When both levels are equal, comparator circuit 14-206 forces signals PRLVLS010 and PRLVLS00 to binary ZEROS.

The circuits of FIGS. 3a and 3b are constructed from standard integrated circuit chips such as those designated in the various circuit blocks (e.g., 74AS823, 74S175, 74AS885, etc., chips circuits manufactured by Texas Instruments Inc.)

DESCRIPTION OF OPERATION

With reference to the timing diagram of FIG. 5, the operation of the apparatus of the present invention shown in FIGS. 3a and 3b will now be described. FIG. 4 shows the coding of the command, address and data lines of bus 11 for special commands generated by central subsystems 14a through 14n to alter the operation of the level register and interrupt circuits of block 16-20.

For level change commands, the command bus line BSRINT must be set to a binary ONE while bus line BSMREF and BSSHBC are set to binary ZEROS. By contrast, when an external I/O interrupt is generated by one of the subsystems of FIG. 1, the command bus lines are coded as shown. The address bus lines BSAD08 through BSAD17 are coded to contain the central subsystem's own channel number while lines BSAD18-23 are coded to contain one of the function codes illustrated in Table I.

As seen from the table, the state of bus address bit 23 (i.e., signal BSAD23) defines whether or not the CPU I/O interrupt busy indicator flip-flop 14-204 is to be cleared to a binary ZERO. Table I also indicates the conditions for the normal setting of flip-flop 14-204 by an external interrupting subsystem. Lastly, the data bus lines BSTDT09 through BSTDT15 are coded as shown (i.e., BSTDT09 must be a ZERO while BSTD10-15 contain the new level number).

During operation, central subsystem 14a upon completing the processing of an interrupt operates to generate a command specifying a level change formatted as shown in FIG. 4. That is, the CPU area 14-2 under microprogram control loads the address, data and command bits into registers 14-10 through 14-14. Additionally, CPU area 14-2 forces bus request signal BUSREQ010 to a binary ONE. This results in my data cycle now, signal MYDCNN000, being forced to a binary ZERO by priority network circuits included within interface area 14-1 when central subsystem 14a has been granted a bus cycle. These circuits, not shown, are conventional in design and may take the form of the circuits disclosed in U.S. Pat. No. 3,995,258.

At that time, the coded command, data and address bits are applied to bus 12 by the driver circuits 14-220 through 14-224. For the level change command, the command bits are set as follows: BSMREF010=0 (not a memory request); BSWRIT010=X (don't care); BSLOCK=X (don't care; BSSHBC010=0 (no second half bus cycle); BSDBWD010=X (don't care); BSDBPL010=X (don't care); BSBYTE010=X (don't care); and BSRINT110=1 (change of level notification). The address and data bits are set as shown in Table I of FIG. 4. Address bit BSAD23 is set as a function of whether or not central subsystem 14a wants to reset I/O busy flip-flop 14-204 allowing the subsystem to resume normal operation.

Figure 5:
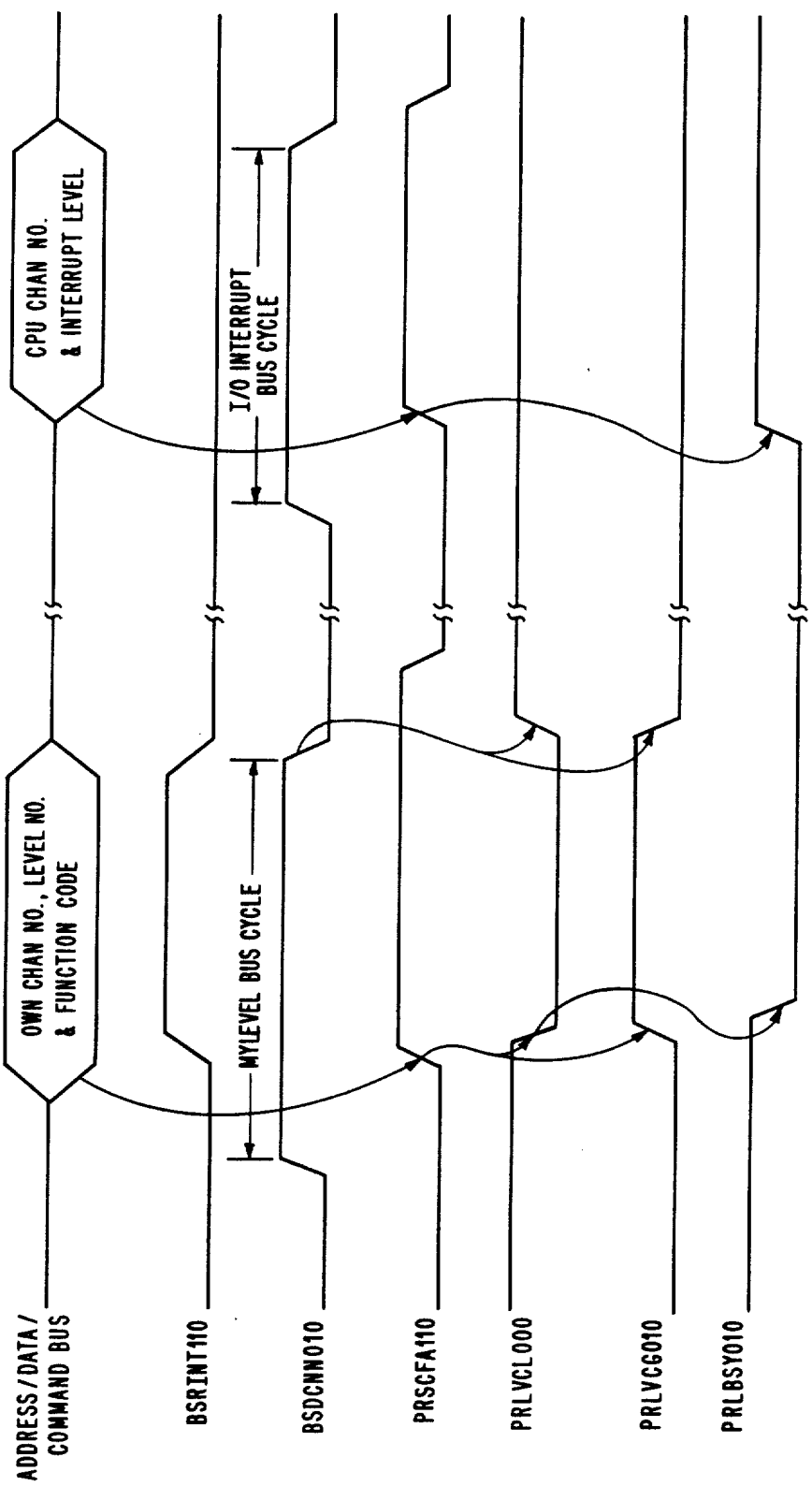
FIG. 5 is a timing diagram used in explaining the operation of the apparatus of the present invention.

As seen from FIG. 5, the transfer of the command results in signal BSRINT110, central subsystem 14a channel number, level number and function code signals being applied to bus 12 when signal BSDCNN010 is generated, granting subsystem 14a a bus cycle. The circuits 14-160 and 14-161 (of FIG. 3a) upon detecting its own channel command operate to force signal CHANOK000 to a binary ZERO and signal PRSCFA010 to a binary one. This results in the states of signals BSSHBC010, PRSCFA010, PRINTA010 and PRINTN010 being loaded into register 14-170.

As seen from FIG. 5, signal PRSCFA110 in turn causes the level change register 14-202 of FIG. 3b to switch the states of signals PRLVCL000 and PRLVCG010 as shown. When signal PRLVCG010 switches to a binary ONE, it enables circuit 14-206 to have its level register loaded with the new level number previously loaded into register 14-200 from the bus data lines BSDT10-15 in response to bus signal BSDCND010.

Signal PRLVCL000 upon being switched to a binary ZERO when signal BSAD23010 is a binary ONE, forces CPU I/O interrupt busy flip-flop to a binary ZERO state. At the end of the bus cycle, signals PRLVCL000 and PRLVCG010 return to their initial states. If no change is desired, signal BSAD23010 is set to a binary ZERO. At this time, central subsystem 14a is ready to process further external interrupts received from bus 12 which have a priority higher than the current level stored in the circuit 14-206.

As seen from FIG. 5, during a subsequent bus cycle, the central subsystem 14a operates to perform an interrupt cycle of operation upon receipt of an interrupt from another one of the subsystems of FIG. 1. At that time, CPU I/O interrupt busy flip-flop 14-204 will be set to a binary ONE as shown in FIG. 5.

From the above, it is seen how the apparatus of the present invention is able to ensure that CPU level changes can be made in a reliable manner with the addition of very little hardware to the normal bus interface circuits. By using the priority circuits associated with the system bus, each central subsystem can perform level changes without interference from any external or internal events. At that time, the subsystem is able to notify the other subsystems of the level change in a reliable synchronized manner.

For reasons of simplification, the BSRINT signal was used both to define the level change command and provide notification. It is obvious that other bits of the command could have been used to define the level change or status change operation to be performed without interference from the units competing for access to the particular shared resource (e.g. processing unit, memory, etc.). Also, the present invention is not limited to having a processing unit specify its own channel number. It can be used by one processing unit to present or cause a level change or status change in another processing unit.

Additionally, it will be appreciated by those skilled in the art that the teachings of the present invention are also applicable to other devices (e.g. memory subsystems) whose operations (e.g. memory locking) also can be adversely affected by competing processing units in a similar way. Thus, the term processing unit can include any unit capable of accepting and generating level change or status change commands.

It will be noted that many other changes may be made to the preferred embodiment without departing from the teachings of the present invention. For example, the present invention is in no way limited to any particular command format or to the number or type of indicators, etc.

When in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A data processing system comprising:
   a plurality of interrupting units and a plurality of processing units coupled in common to a system bus for asynchronously transferring interrupt requests between said plurality of interrupting units and each of said plurality of processing units during different bus cycles of operation, each processing unit sending a notification signal of a priority level change only during a granted bus cycle of operation, thereby eliminating interference from asynchronously occurring events, each of said plurality of processing units including:
   command generating means coupled to said bus for applying commands to said bus during bus cycles of operation granted to said processing unit;
   interrupt processing apparatus coupled to said bus for receiving said interrupt requests including interrupt level signals specifying any one of a number of interrupt levels; and
   response means coupled to said interrupt processing apparatus, said response means for generating signals on said bus in response to requests from said interrupting units;
   said response means including decode means coupled to said bus, said decode means being operative in response to a command from any one of said processing units applied to said bus during one of said bus cycles of operation specifying a change in interrupt level to generate and output signals; and
   said interrupt processing apparatus including:
   means for storing a current interrupt level, said means for storing being coupled to said bus and including comparison means for comparing a currently processed interrupt level with new interrupt level signals from an interrupting unit; and
   said means for storing being conditioned by said output signal to load said new interrupt level signals from said bus, whereby a change of the respective processing unit's interrupt level is accomplished without interference from other processing units coupled to said system bus.

2. The system in claim 1 wherein each of said units include means for signalling the granting of a bus cycle on a priority basis.

3. The system of claim 1 wherein said decode means includes channel number decoder means coupled to said system bus for generating a signal upon detecting that a channel number assigned to said processing unit has been applied to said bus by any one of said processing units and wherein said command includes an address poriton coded to include said channel number assigned to said each processing unit, said channel number decoder means in response to said command causing said output signal to be applied to said interrupt processing apparatus for producing said change in interrupt level.

4. The system of claim 1 wherein said interrupt processing apparatus further includes interrupt indicator circuit means coupled to said bus and to said means for storing, said interrupt indicator circuit means being conditioned by said output signal to switch state as specified by said command, said interrupt indicator circuit means when in a first state inhibiting said interrupt processing apparatus from accepting interrupts and said interrupt indicator circuit means when in a second state enabling said interrupt processing apparatus to accept interrupts.

5. The systems of claim 4 wherein said interrupt processing apparatus further includes register means coupled between said system bus and said means for storing, said register means being enabled during said one of said bus cycles of operation to store signals corresponding to said current interrupt level for application to said means for storing.

6. The system of claim 4 wherein said command further includes a data portion, said interrupt processing apparatus further including register means coupled to said bus for receiving said output signal, said common and address portions of said command, said register means in response to said command and address portions generating first and second complementary output signals for conditioning said means for storing and said interrupt indicator circuit means respectively to change said interrupt level and state as specified by said data and address portions respectively of said command.

7. A data processing system comprising a plurality of units coupled in common to a system bus for asynchronously transferring requests between said plurality of units during different asynchronously generated bus cycles of operation, different ones of said plurality of units each including:
   command generating means coupled to said bus for applying commands to said bus during bus cycles of operation granted to said unit;
   level processing means coupled to said bus for receiving said requests including signals specifying any one of a number of status levels; and response means coupled to said level processing means, said response means for generating signals on said bus in response to requests from said units;

said response means including decode means coupled to said bus, said decode means being operative in response to a command from one of said different ones of said units applied to said bus during one of said bus cycles of operation specifying a change in status level to generate an output signal; and said level processing means including:

means for storing a current status level, said means for storing being coupled to said bus and including comparison means for comparing a current status level signal with a new status level signal from a respective unit; and said means for storingf being conditioned by said output signal to load said new status level signal resulting in a change of the status level of the respective unit without interference from any other unit coupled to said system bus.

8. The system of claim 7 wherein each of said units include means for signalling the granting of a bus cycle on a priority basis 9. The system of claim 7 wherein said decode means include channel number decoder means coupled to said system bus for generating a signal upon detecting that a channel number assigned to said unit has been applied to said bus by any one of said units and wherein said command includes an address portion coded to include said channel number assigned to said each unit, said channel number decoder means in response to said command causing said output signal to be applied to said interrupt processing apparatus for producing said status change level.

10. The system of claim 7 wherein said level processing means further includes indicator circuit means coupled to said bus and to said means for storing, said indicator circuit means being conditioned by said output signal to switch state specified by said command, said indicator circuit means when in a first state inhibiting said level processing means from accepting requests and said indicator circuit means when in a second state enabling said level processing means to accept requests.

11. The system of claim 10 wherein said level processing means further includes register means coupled between said system bus and said means for storing, said register means being enabled during one of said bus cycles of operation to store signals corresponding to said current status level for application to said means for storing.

12. A method of changing the operational status of any one of a plurality of units coupled in common to a system bus for asynchronously transferring requests between said plurality of units during different asynchronously generated bus cycles of operation, different ones of said plurality of units each including command generating means coupled to said bus for applying commands to said bus, operating level processing means coupled to said bus for receiving said requests including signals specifying any one of a number of status levels, said operating level means including means for storing a current status signal and comparision means for comparing said current status signal with a new status level signal from an interrupting unit and response means coupled to said level processing means for generating signals on said bus in response to requests from said interrupting units, said method including the steps of:

(a) requesting a bus cycle of operation;

(b) generating by said command generating means, a command specifying a change in operational status of one of said plurality of units, said command including at least first and second portions, said first portion being coded to specify the change in status and said second portion being coded to specify the new operational status;

(c) transferring said command to said bus during a bus cycle of operation granted in response to step (a);

(d) including decode means in said response means for generating an output signal indicating a status change in response to said first command portion of said command;

(e) conditioning said means for storing in response to said output signal to switch the operational status of said unit to said new operational status specified by said second portion of said command without interference from any other unit coupled to said system bus; and (f) during the same bus cycle of operation, notifying the remaining units that a change in status had occurred enabling resumption of normal operation.

* * * * *